US005687049A

United States Patent [19]
Mangtani

[11] Patent Number: 5,687,049
[45] Date of Patent: Nov. 11, 1997

[54] METHOD AND CIRCUIT FOR PROTECTING POWER CIRCUITS AGAINST SHORT CIRCUIT AND OVER CURRENT FAULTS

[75] Inventor: Vijay Mangtani, El Segundo, Calif.

[73] Assignee: International Rectifier Corporation, El Segundo, Calif.

[21] Appl. No.: 592,493

[22] Filed: Jan. 26, 1996

[51] Int. Cl.[6] ............................................. H02H 7/00
[52] U.S. Cl. ............................. 361/18; 361/98; 363/51
[58] Field of Search ..................... 363/51, 37; 361/18, 361/87, 93, 94, 98

[56] References Cited

U.S. PATENT DOCUMENTS

| | | | |
|---|---|---|---|
| 4,706,177 | 11/1987 | Josephson | 363/24 |
| 4,870,556 | 9/1989 | Inaba et al. | 363/41 |
| 4,894,762 | 1/1990 | Steinshorn | 363/35 |
| 5,123,746 | 6/1992 | Okado | 363/37 |
| 5,155,671 | 10/1992 | Inaba et al. | 363/37 |
| 5,280,228 | 1/1994 | Kanouda et al. | 318/803 |

FOREIGN PATENT DOCUMENTS

| | | |
|---|---|---|
| 0010980 | 5/1980 | European Pat. Off. . |
| 0490388 | 6/1992 | European Pat. Off. . |
| 2228637 | 8/1990 | United Kingdom . |
| 8201794 | 5/1982 | WIPO . |

*Primary Examiner*—Jeffrey A. Gaffin
*Assistant Examiner*—Michael J. Sherry
*Attorney, Agent, or Firm*—Ostrolenk, Faber, Gerb & Soffen, LLP

[57] ABSTRACT

A fault protection circuit for protecting IGBT's and other non-latching semiconductor devices in power circuits, for example, power converting/inverting circuits, against phase to phase, phase to earth and shoot through short circuit faults as well as against over current faults. The circuit provides local protection for devices on the high side of such power circuits, and transfers the fault to the low side where it is detected and appropriate control circuitry is activated to latch the fault, thereby avoiding the need for isolcated sensing or feedback to protect the high side devices as well as the complete power circuit.

6 Claims, 6 Drawing Sheets

METHOD AND CIRCUIT FOR PROTECTING POWER CIRCUITS AGAINST SHORT CIRCUIT AND OVER CURRENT FAULTS

BACKGROUND OF THE INVENTION

1. Field of the Invention

The present invention is directed to power semiconductor devices and, more particularly, to a method and circuit designed to protect power circuits, for example, power converting/inverting circuits, against phase to phase, phase to earth and shoot through short circuit faults as well as against over current faults.

Very generally, the present invention deals with the problem of protecting devices such as IGBT's and other non-latching power semiconductor devices that are used in high power applications, where these devices can become damaged under certain over current conditions. For the sake of brevity, the description which follows will refer to IGBT's, it being understood that the method and circuit of the present invention are applicable to power semiconductor devices generally.

2. Description of the Related Art

IGBT inverters are popular for a variety of power conversion applications. In one application, these inverters serve to convert a DC bus voltage into single or three phase AC voltage outputs. IGBT's have limited overload capacity or fault tolerance. Hence, fast acting detection and protection circuits are required to sense any fault, e.g. a short circuit, and shut off the gate drive to the power device in the event of a fault fast enough to prevent destruction of the device.

Faults related to excessive currents can be broadly classified as short circuit faults and over current faults.

Short circuit faults occur where the current carrying power device is forced to carry excessive amounts of current, usually through a path not involving the load connected to the power conversion circuit. Due to the large current, the voltage across the device rises to a high value, which value depends on the DC bus voltage, the impedance and other devices in the fault path, as well as on device's intrinsic characteristics. The high voltage across the device, in turn, causes excessive power losses within the device, which causes it to overheat and destruct. Therefore, it is necessary to quickly shut off the power circuit upon occurrence of a short circuit fault to prevent its destruction.

The aforementioned class of short circuit faults can itself be subdivided into three subcategories:

a) Phase to phase short circuit: This type of fault occurs when two (or more) outputs of the inverter are shorted. Short circuit current flows from the positive bus to the negative bus of the circuit through the power devices carrying the fault current.

b) Phase to earth short circuit: This type of fault occurs when one (or more) of the outputs of the inverter is (are) shorted to earth. Current can flow either from the positive DC bus to earth or from the negative DC bus to earth, depending upon the device that is conducting the short circuit current.

c) Shoot through fault: If two devices in the same leg of an inverter circuit (e.g. series-connected devices) are turned on simultaneously, or a device is turned on to conduct current into a conducting or shorted device of the same leg, excessive current flows through from the positive bus to the negative bus through the devices in the same leg. Effectively, this type of fault is similar to a phase to phase fault and, as will be shown, can be sensed and treated as a phase to phase fault.

Over current faults occur when one or more of the devices in the inverter carry a current lower than the short circuit current, but higher than the continuous current carrying capacity of the device. This type of fault current usually flows between two (or more) outputs of the inverter, through the load connected between them. Since the magnitude of current is lower than the short circuit current, the voltage across the device is more or less dependent upon the inherent characteristics of the device. The associated losses are therefore lower than those encountered during short circuit conditions. These types of faults can be tolerated for comparatively longer times, compared to short circuit currents. For this class of faults, it is desirable to have an over current protection with inverse time characteristics so that devices do not shut off during temporary overloads which can be safely tolerated by the power devices.

It is known to detect short circuit and over current faults using the following two general approaches. A first approach involves desaturation sensing. During a short circuit, the voltage across the device rises to a high value determined by the DC bus voltage of the inverter, the impedance and the presence of other devices in the fault path, as well as on the inherent characteristics of the device. Hence, high voltage across the device when the device has been turned on can be interpreted as a short circuit fault, which can then be fed back to a control circuit to initiate shut down of the power device(s) through control signals passing between the power devices and the control circuit. Interfacing these signals is not trivial because the potential difference between their operating voltages can be on the order of hundreds of volts. Therefore, the signals are fed to and from the control circuit through some form of galvanic isolation, usually optocouplers. As is known, in the typical inverter some of the devices are connected to the high side of the DC bus and other devices to the low side thereof. Each high side device must therefore use at least one optocoupler for feeding signals to and from the control circuit.

Further, the prior art desaturation detection scheme cannot by itself sense and provide over current protection. Hence, over current protection is typically added with some form of current sensing such as by using a shunt, a Hall effect current transformer, a high frequency DC current sense element, or the like.

The second of the two known approaches for sensing short circuits involves current sensing. In accordance with this approach, DC current is sensed in the positive, negative or both DC buses using some form of current sensing as current shunt, Hall effect sensors, etc. Sometimes, a current transformer (CT) is provided at the output for differential sensing of P-E (phase to earth) faults. Many current sensing schemes are known. One of these schemes provides a current sensor both in the positive as well as in the negative DC buses. This requires providing a separate current sensor in the positive and negative buses, and a separate detection circuit for each sensor. Sensing and detection circuits operating with the high side DC bus must use some form of galvanic isolation to convey all conditions to the control circuits. These circuits can be configured as (a) a shunt in the positive bus with an optocoupler; (b) a Hall effect current sensor in the positive bus; (c) a high frequency DC CT (HFDCCT) in the positive bus. The isolated output of a fault through the positive bus in isolated or non isolated output of a fault to a negative bus is fed to control circuit, which detects and cuts off drive signals to the gates of the power handling devices in the event of any fault.

Another known current sensing scheme employs a single current sensor, connected for additive sensing. That is, a single current sensor is used with the positive and negative DC buses acting as two primaries in additive fashion. The currents from the positive as well as the negative DC buses are both passed through the same sensor. During normal, overload and phase to phase short circuit conditions, the output of the sensor is proportional to the sum of the positive and negative bus currents, each scaled by the number of respective turns on the primary. During phase to earth faults, the sensor output is proportional to the fault current scaled by the respective number of primary turns of the positive or negative DC buses. The isolated output of the sensor is fed to the control circuit, which detects and cuts off gate drive signals in the event that any fault is detected.

Yet another prior art scheme involves the use of one proportional and one differential current sensor. The proportional current sensor (isolated or non-isolated) is used to monitor either the positive or negative bus current. The output sensor is used to detect phase to phase short circuit and/or over current faults. The isolated differential current sensor is used to measure the differential current in the positive and negative buses or at the outputs of the inverter. The output of this differential current sensor is used to detect phase to earth faults.

All of the aforementioned prior art schemes use some form of isolation, for example, optocouplers, to couple signals reflecting fault conditions to control circuits.

SUMMARY OF THE INVENTION

One object of the present invention is to provide a method and circuit to protect power devices against various short circuit and over current faults which has a simpler construction and uses fewer parts.

Another object of the invention to provide a method and circuit for power circuit protection which reduces the number of galvanic isolators needed for detecting and controlling power devices.

A further object of the invention is to realize a circuit and method which provides local protection for the high side power devices, and in which high side faults are latched when they are sensed on the low side power devices, to avoid the use of isolated sensing or feedback signals from the high side to the low side as is required by other methods of protection against faults on high side power devices.

A still further object of the invention is to provide a method and circuit for protection of semiconductor power devices which is cost effective and which increases efficiency due to the use of a single current sensor when a resistive sensing element is used.

The present invention arises from the recognition that prior art schemes sense the occurrence of faults, and thereafter feedback a signal reflecting the fault to a control circuit to cause shut down. A more efficient circuit can be obtained if the following two conditions are appreciated.

1. All of the aforementioned faults (except for the phase to earth from the positive bus to earth) can be sensed on the negative bus.
2. If the high side devices are turned off by local protection circuits, the occurrence of a phase to earth fault from the positive bus to earth transfers to the negative bus where it can be detected (due to the inductance in the fault current) through the diode connected in parallel across the low side power devices. In due course, after the low side power device turns on, the fault current transfers and manifests itself as a negative bus to earth fault condition, where it can be detected.

The aforementioned objectives and recognition have led to the present invention which uses a current sensor in the negative bus, and only desaturation detection and a local shut off scheme for the high side transistors. Feeding or coupling of signals between the high side and a control circuit is not required.

Thereby, in the event of either an over current fault, a phase to phase short circuit fault, or a phase to earth fault through the negative bus, the current sensor in the low side senses the fault current and communicates the same to a control circuit which produces control signals which turn off the gate signals to the power devices. During a phase to phase short circuit fault, desaturation detection shut down procedure on the high side is made to react at a speed that is slightly slower than the reaction speed of the current sensing shut down at the lower side. Therefore, the low side current sensing shut down comes into effect first, causing the FAULT pin to become active and latching the fault, thereby stopping all gate input signals. This allows the circuit to latch the fault condition and to cut off input signals to all devices.

In the event of a phase to earth short circuit fault through the positive bus, desaturation detection shut down of the high devices cuts off the drive signal for the particular IGBT device exhibiting high voltage, preventing the failure of the high side device on a cycle by cycle basis. Current then commutates to the low side diode due to inductance in the fault path. The direction of current is from negative bus to earth. If the inductance in the fault path is low enough, current may become zero before the low side transistors turn on. The current commutates from the low side diode to the low side transistor, flowing from earth to negative bus. The aforementioned current sensing circuit then becomes active as previously explained by either sensing the current flowing from the negative bus to earth to the low side diode or the current flowing from earth to the negative bus, depending upon the sensing method used.

In any event, the method of the present invention does not require any isolated fault signals and feedback to be coupled from the high side devices to a control circuit for effective operation of a protection circuit. Nonetheless, it should be recognized that if it is desired to include such isolation circuits for some reason, optocouplers or other isolated scheme can be added easily.

Other features and advantages of the present invention will become apparent from the following description of the invention which refers to the accompanying drawings.

DETAILED DESCRIPTION OF THE PREFERRED EMBODIMENT

FIG. 1 illustrates a known inverter circuit 10, which operates with a positive DC bus 12 and a negative DC bus 14. The potential difference between the buses 12 and 14 is high, sometimes 600 volts DC or higher. The inverter 10 is supplied with three phase AC line power, in a manner so that a first phase thereof is applied at an input 16 between the anode of a diode 22 and cathode of the diode 28; the second phase is supplied at a input terminal 18 between the respective anode and cathode of diodes 24 and 30; and the third phase is applied at an input 20 between the respective anode and cathode of the diodes 26 and 32. The anodes of the diodes 22, 24 and 26 are commonly connected to the positive DC bus 12, whereas the anodes of the low side diodes 28, 30 and 32 are connected to the negative DC bus 14. A voltage integrating (smoothing) capacitor 34 is provided between the buses 12 and 14.

In a well known manner, the positive phases of the power applied at the input 16, 18 and 20 are rectified by the diodes 22, 24 and 26, producing a positive DC voltage at the bus 12, while the negative phases are rectified by the diodes 28, 30 and 32, resulting in a negative DC voltage at the bus 14. The DC voltage potential between the buses 12 and 14 is used as an input DC voltage source for the power devices, for example, IGBT's 36–46 which produce therefrom three phase, high frequency pulsed energy (AC) voltage outputs at outputs terminals U, V and W. These outputs are obtained by turning the power devices 36–46 on and off at a high frequency and in a manner whereby the two devices associated with each output U, V, and W, for example, the devices 36 and 42, are turned on mutually exclusively, again in a well known manner. Although not shown, it is widely known that the devices 36–46 are controlled by applying control signals to their gate electrodes 36a, 38a, 40a, 42a, 44a and 46a, respectively. The circuit 10 of FIG. 1 also shows the known free wheeling diodes 36b–46b, which are associated with the power devices 36–46, respectively.

Figure 1A:
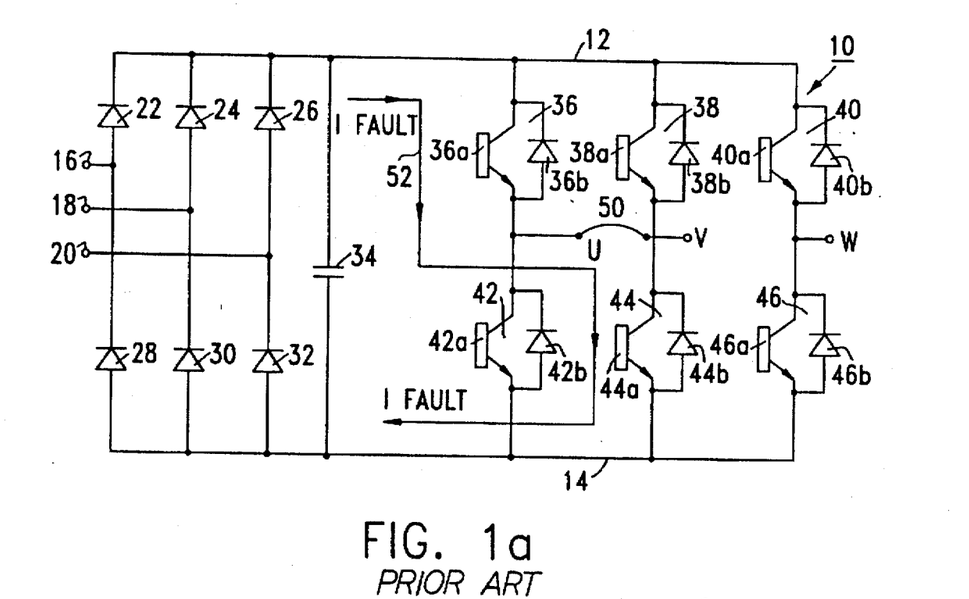
FIGS. 1A, 1B and 1C show the same prior art inverter circuit, respectively illustrating a phase to phase short circuit fault, a phase to earth short circuit fault and a shoot through fault.

The inverting circuit 10 of FIG. 1a can be catastrophically destroyed in the event that a short circuit develops between any of the outputs U, V, W, as indicated graphically by the line 50 extending between outputs U and V in FIG. 1a. Since in the ordinary operation of the inverting circuit 10 both power devices 36b and 44b are turned on for periods which partially overlap, the short 50 results in phase to phase short circuit current flowing from the positive DC bus 12 to the negative DC bus 14 through IGBT's 36 and 44 as indicated by the current path line 52.

Figure 1B:
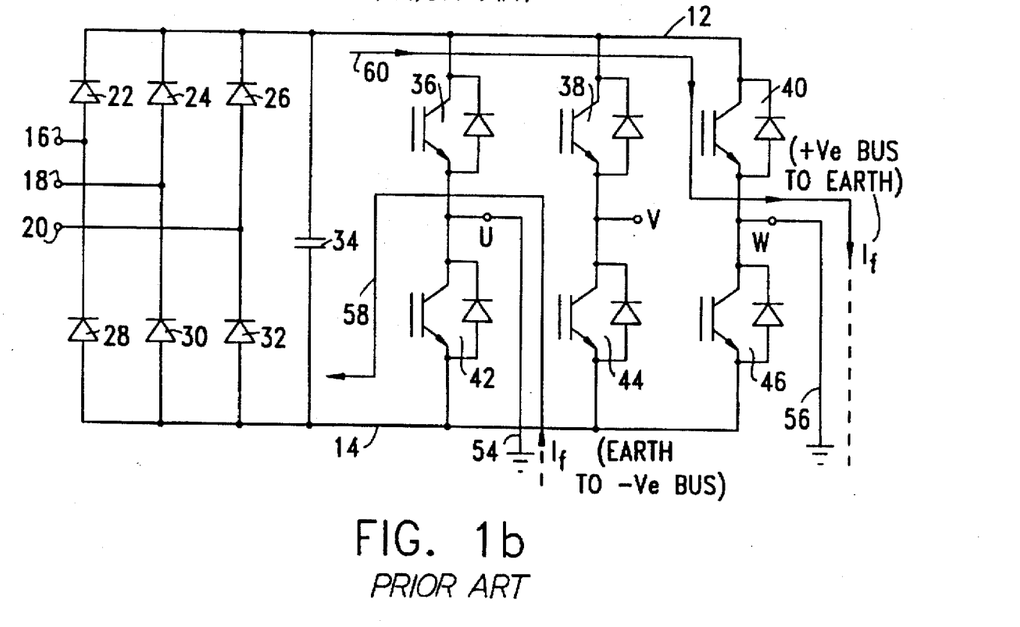

A phase to earth short circuit fault current path is illustrated in FIG. 1b. This type of fault can result from the output U being shorted to earth as indicated by the line 54, or by the output W being shorted to earth as indicated by the line 56. The short circuit current path line 58 represents a phase to earth short circuit current flowing when the device 42 is turned on, while a phase to earth short circuit current flowing from the positive DC bus 12 to earth when the device 40 is turned is indicated by the line 60.

Figure 1C:
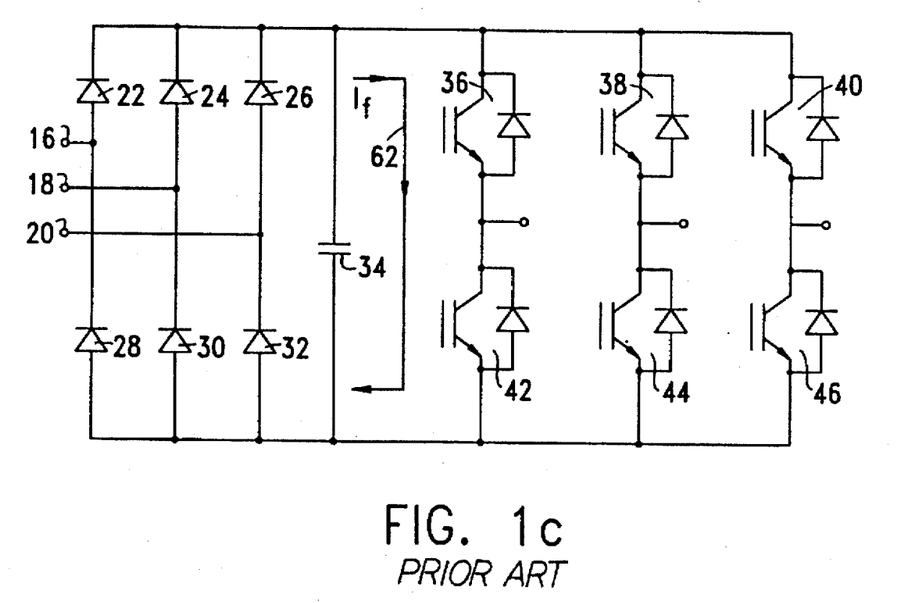

A shoot through fault results when both devices in any leg of the inverting circuit 10, for example devices 36 and 42, are turned on simultaneously FIG. 1c. The short circuit current path is indicated by line 62.

Figure 2:
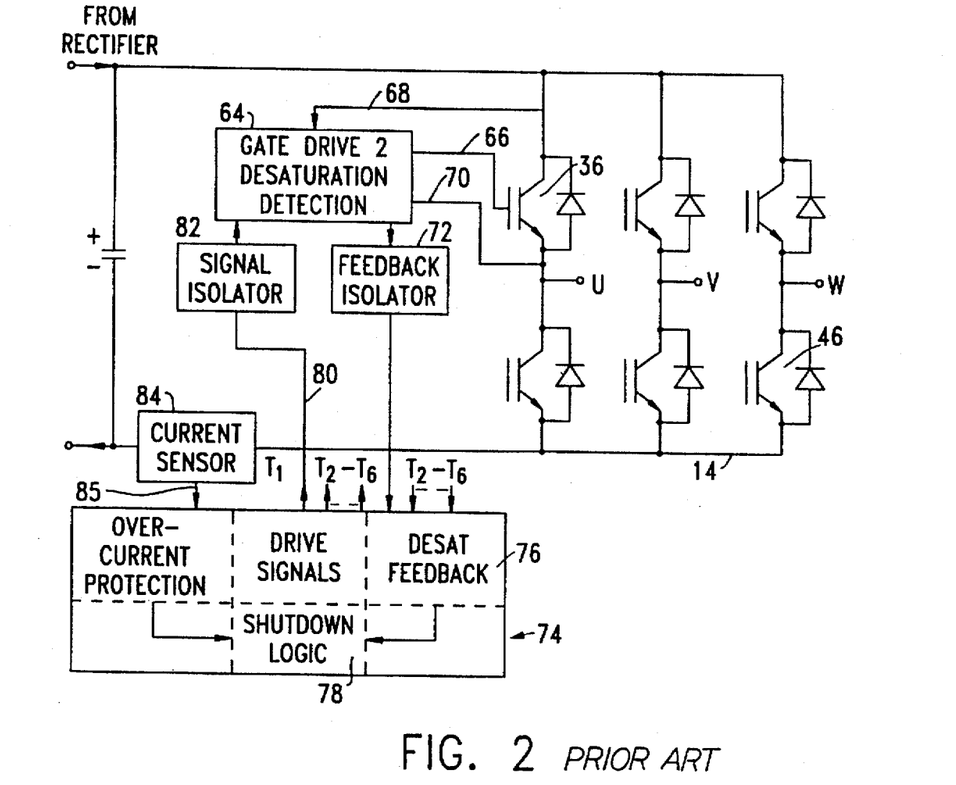
FIG. 2 shows a first prior art protection circuit.

A first prior art protection circuit for the aforementioned short circuit and shoot through over current conditions is depicted in FIG. 2, which illustrates the power devices 36–46 together with a protection circuit which includes a respective gate drive desaturation detector 64 which has an output 66 for driving the gate of its respective power device and inputs 68 and 70 for sensing the voltages across the collector and emitter junctions of the power device. In the event of short circuit, collector emitter voltage rises; this voltage rise is detected by a localized protection circuit 64, which shuts down that particular IGBT and sends feedback through to desat feedback receiving section 76 of control circuit through feedback isolator 72. Control circuit shutdown logic 78 receives a system shutdown signal from desaturation feedback detection 76 and cuts off gate drives T1 to T6 being fed to all transistors. These sensed voltages are fed through a feedback isolator 72 to a control circuit 74 in which a base emitter saturation feedback section 76 determines the magnitude of the sensed voltage and a shut down logic section 78 produces controls T1–T6 for controlling the gates of the power devices. As an example, the control signal T1 is shown to be supplied over line 80 and through the signal isolator 82 to the gate drive circuit 64. These signals can be used to turn off the power devices; power device 36, for example, is turned off by a signal which causes the gate drive 66 to become inactive.

As should be readily apparent, the circuit blocks 64, 72 and 82 are repeated for each of the power devices 36–46. The protection circuit of FIG. 2 further includes a current sensor 84 which is located in the negative DC bus 14 for sensing over current conditions, i.e. currents exceeding the maximum current expected to be drawn by the load. This condition is communicated over line 85 to the control circuit 74, which causes the circuits 64 and 82 to react as previously described.

Figure 3:
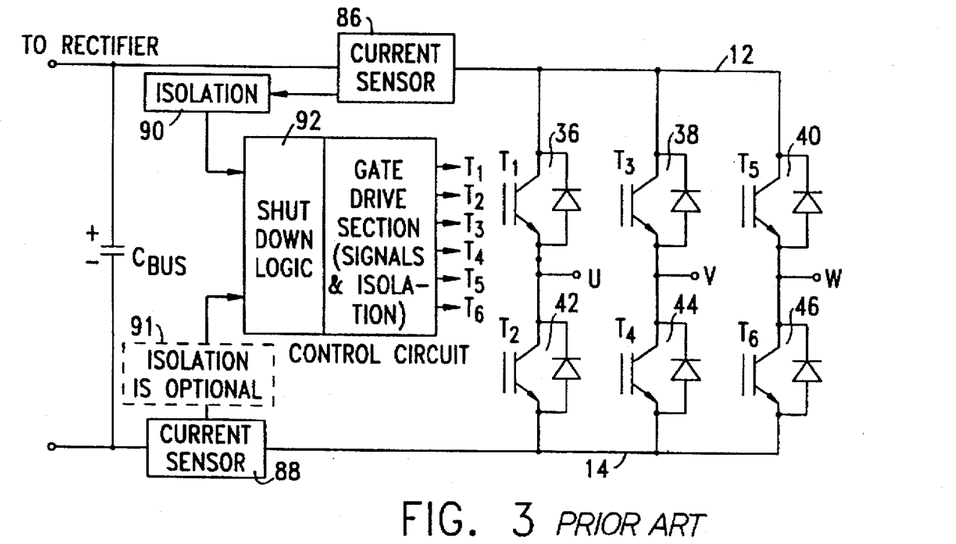
FIG. 3 shows another prior art short circuit protection circuit.

The conventional circuit of FIG. 3 includes current sensors 86 and 88, respectively sensing current in the positive and negative DC buses 12 and 14, a signal isolator 90 for the current sensor 86 and an optional isolation circuit 91 for the current sensor 88. As before, the control circuit 92 has a gate drive section which supplies control signals (through appropriate isolation elements) to the power devices 36–46.

Figure 4:
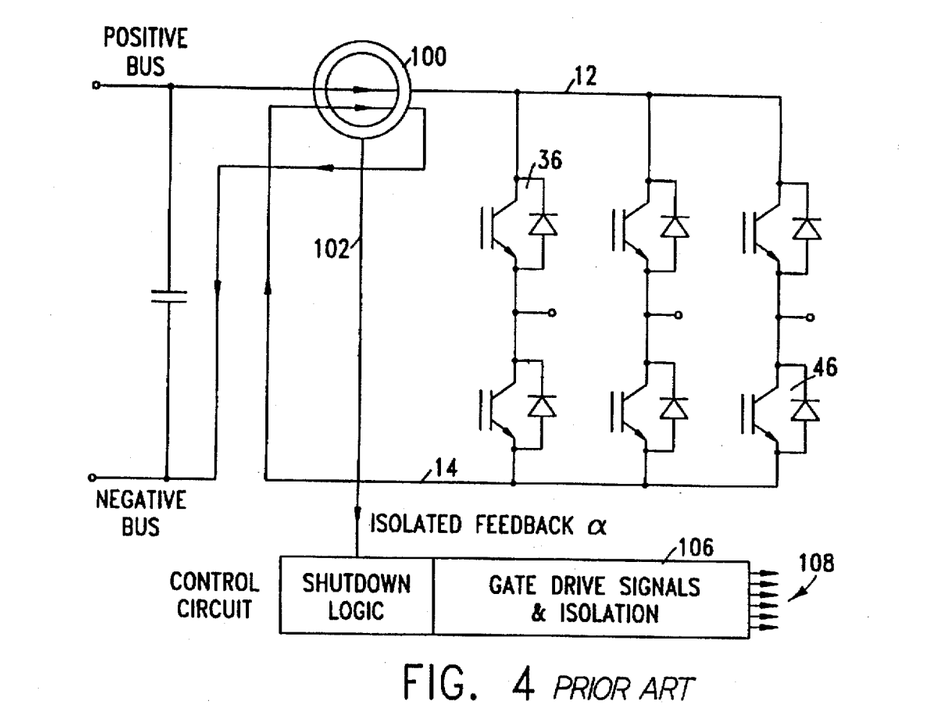
FIG. 4 shows a further prior art protection circuit.

A third, prior art approach to providing protection is illustrated in FIG. 4 in the form of a single current sensor 100 which provides an output 102 representing the sum of the currents flowing in the positive bus 12 and in the negative bus 14. The sensor's output is fed to the control circuit 106 through an isolation circuit 104. A plurality of control signals 108 are provided through appropriate isolation to the devices 36–46, as before.

Figure 5:
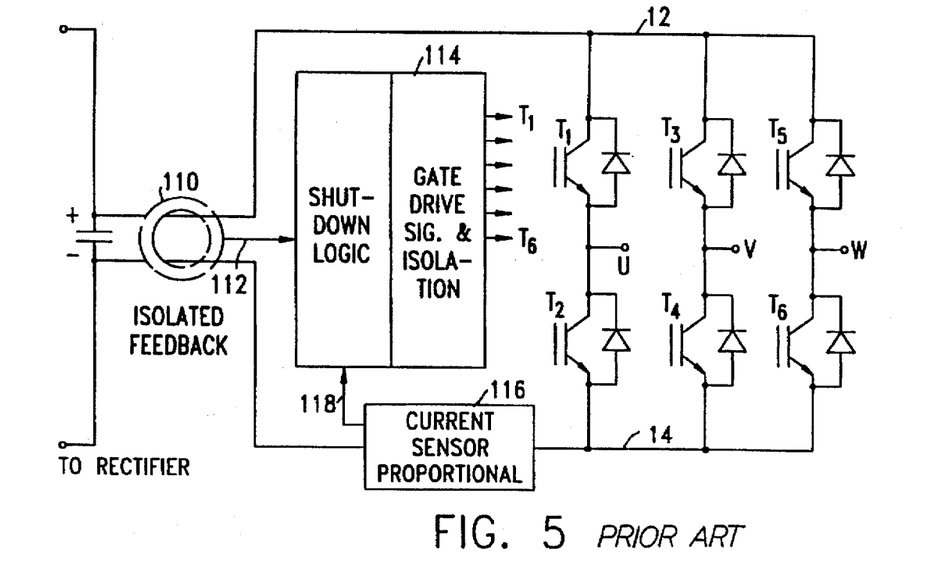
FIG. 5 shows yet another prior art protection circuit using proportional and differential current sensors.

In contrast to FIG. 4, the prior art protection circuit of FIG. 5 uses a current sensor 110 which differentially senses the net current flowing in the buses 12 and 14. The output of the sensor is coupled to a control circuit 114. Another current sensor 116 is connected in series with the negative bus to provide to the control circuit 114 an output 118 which is proportional to the current in the negative DC bus 14. An isolation circuit (not shown) may by added between the current sensor 116 and the control circuit 114. In other respects, the control circuit 114 operates like the previously described control circuits.

Figure 6:
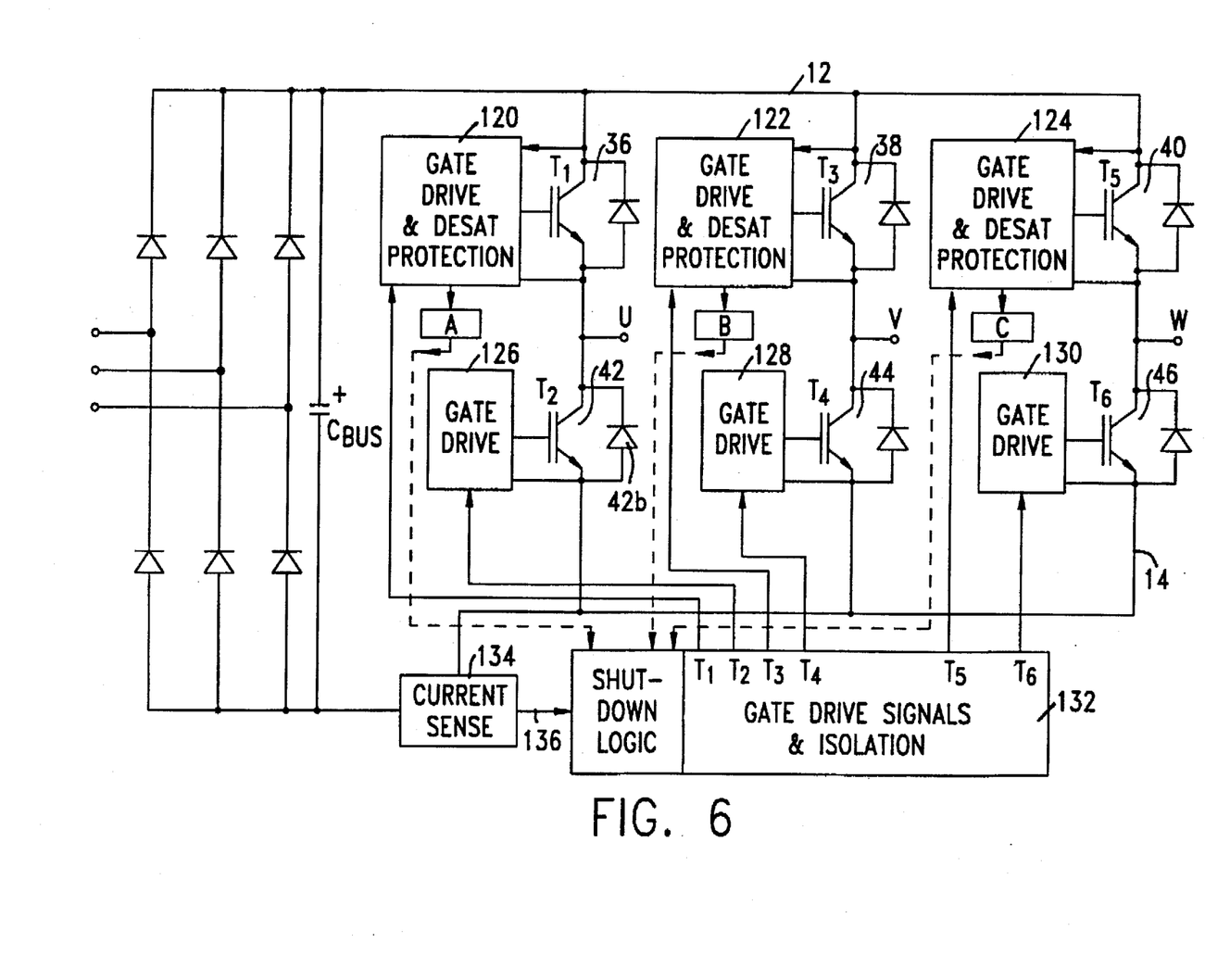
FIG. 6 is a schematic of a protection circuit for a high power device in accordance with the present invention.

All prior art protection circuit schemes use some form of isolation between the sensing element and the control circuit at least for the high side to communicate therebetween information about fault conditions and responsive control signals. In contrast, the present invention which is illustrated in FIG. 6 provides a respective gate drive desaturation protection circuit 120, 122 and 124, for each of the high side power devices 36, 38 and 40. The need to use isolation circuits has been obviated. The low side power devices 42, 44 and 46 only have respective gate drive circuits 126, 128 and 130.

The control circuit 132 of the present invention provides, in conventional manner, gate drive outputs T2, T4 and T6 for the gate drivers 126, 128 and 130, respectively. The protection circuit does not require a fault feedback path between high side gate drive and desaturation protection circuits 120, 122, 124 and the control circuit 132. Nonetheless, if desired, such a communication can be added as indicated by dashed lines, through isolation circuits, from the high side gate drivers and desat protection circuits to shutdown logic section of control circuit 132. The current sensor 134 senses the current flowing in the negative DC bus 14, providing an output 136 to the control circuit 132. The protection circuit of the present invention is efficient and requires less components compared to conventional protection circuits. It does not require (but can include) isolation circuits for the high side gate drive circuits.

As previously explained, operation of the circuit in FIG. 6 during the various fault conditions is as follows: in the event of either an over current fault, phase to phase short circuit fault, or phase to earth fault through the negative bus, the current sensor 134 will sense the fault current and the associated control circuit 132 will turn off the gate signals to all the devices. During a phase to phase short circuit fault, desaturation detection circuit 120, 122 and 124 are designed to shut down the high side power devices 36, 38 and 40 after a delay which is long enough to ensure that a current sensor 134 will become operative first, causing the FAULT pin to become active and the latch to stop all input signals. This allows the circuit to latch the fault condition and cut off the input signals to all devices. (If the high side reacted first, the fault would continue to manifest itself each successive cycle, since the fault would never be latched.)

Should there be a phase to earth short circuit through the positive bus, the desaturation detection devices 120, 122 and 124 will cut off the particular high side power device (IGBT) on a cycle by cycle basis, preventing the failure of that device. Current then commutates to the low side diode due to inductance in the fault path, the direction of current being from the negative bus 14 to earth. For example, should the device 36 experience a high desaturation voltage, its over current will commutate to the low side diode 42b, which is in the same leg of the protection circuit. If the inductance in the fault path is low enough, the current may become zero before the low side transistor, for example, transistor 42, turns on. The current commutates from the low side diode, e.g. diode 42b, to the low side power device, e.g. 42, flowing from earth to the negative bus 14. The current sense circuit 134 becomes active as explained above by either sensing the current flowing from the negative bus to earth through the low side diode or the current flowing from earth to the negative bus 14, depending upon the sensing method used.

Figure 7:
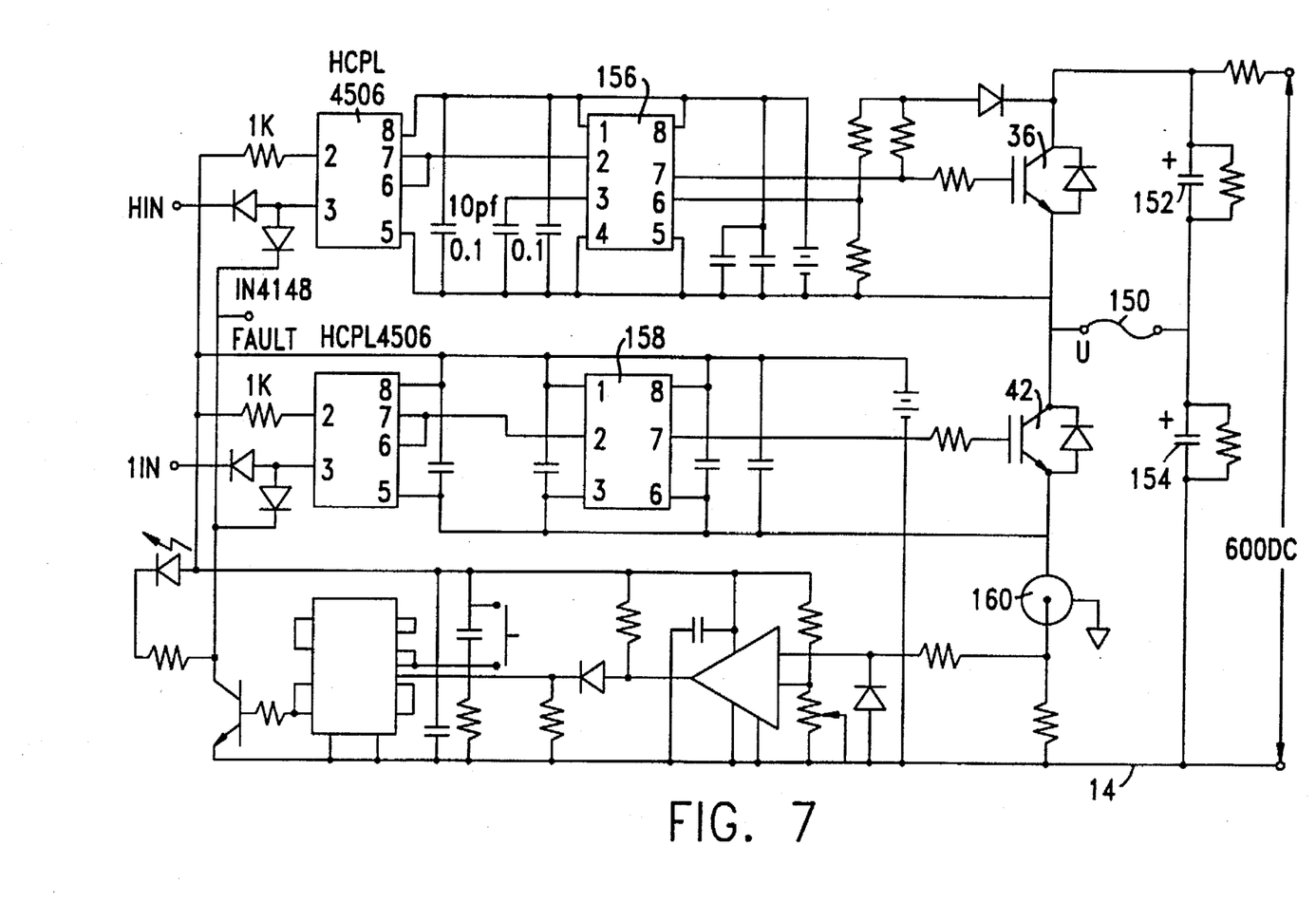
FIG. 7 is a detailed schematic of a preferred embodiment of the present invention.

FIG. 7 shows a detailed schematic of an embodiment of the invention which has been reduced to practice, for an application using a circuit receiving as an input single phase power. A phase to earth short circuit is obtained by shorting the output U with a short 150 to the midpoint of a pair of series-connected capacitors 152 and 154 which have been charged to 600 volts DC. The device 156 comprises the gate drive and desaturation protection circuit corresponding to the element 120 in FIG. 6, which is coupled to the high side power device 36. The device 156 may be a commercial circuit marketed by the International Rectifier Corporation as part IR 2125. Device 156, in conjunction with an external capacitor, provides the high side delay discussed previously.

A corresponding gate driver 158, for example an International Rectifier part IR 2117, provides the gate drive for the low side power device 42. Reference numeral 160 comprises the current sensor 134 of FIG. 6. It is designed to sense the current in the negative DC bus 14.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A protection circuit for high power switching devices, comprising:

at least one pair of series-connected power devices including a first and a second power device connected between a high side and a low side of a DC bus, respectively;

a first control circuit for activating said power devices to obtain a pulsed output voltage from said power devices;

a gate drive desaturation protection circuit coupled to said first power device;

a current sensing element connected to said low side of said DC bus for sensing a current flowing through said low side;

a second control circuit coupled to said current sensing element for sensing at least one of an over current and a short circuit current flowing in said low side and being effective to turn off said second power device through a gate drive; and wherein said gate drive desaturation protection circuit is effective to protect said first power device on a cycle by cycle basis against an over current condition until an input into said first power device is disabled in response to a control signal from said second control circuit.

2. The protection circuit of claim 1, further comprising a second and a third pair of power devices.

3. The protection circuit of claim 2, wherein each pair of power devices includes a high side power device and a low side power device and wherein each said high side power device has a respective gate drive and desaturation protection circuit associated therewith and each said low side power device has a gate drive circuit associated therewith.

4. The protection circuit of claim 1, wherein the gate drive desaturation protection circuit operates to delay shut down of said first power device such that said second control circuit will detect said at least one over current and short circuit current and disable said power devices.

5. The protection circuit of claim 1, wherein said current sensing element is a shunt resistor.

6. The protection circuit of claim 1, wherein said current sensing element is a current sense transformer.

* * * * *